United States Patent [19]

Pritchard et al.

[11] Patent Number: 4,844,111

[45] Date of Patent: Jul. 4, 1989

[54] HIGH PRESSURE REGULATOR VALVE

[75] Inventors: Francis E. Pritchard, Buffalo; Vincent J. Kibler, West Falls, both of N.Y.

[73] Assignee: Union Carbide Corporation, Danbury, Conn.

[21] Appl. No.: 98,997

[22] Filed: Sep. 21, 1987

[51] Int. Cl.[4] ............... F16K 17/14; F16K 31/12
[52] U.S. Cl. ............... 137/71; 137/505.25; 137/882
[58] Field of Search ............... 137/505.25, 71, 881, 137/883, 861, 882

[56]  References Cited

U.S. PATENT DOCUMENTS

| 1,731,519 | 10/1929 | Bastian | 137/881 |
| 2,047,750 | 7/1936 | Smith | 137/71 |
| 2,195,728 | 4/1940 | Jones et al. | 137/71 |
| 2,414,113 | 1/1947 | Mapes | 73/37 |
| 2,645,241 | 7/1953 | Riede | 137/235 |
| 3,211,175 | 10/1965 | Replogle | 137/493 |
| 3,930,517 | 1/1976 | Gagala | 137/71 |
| 4,461,657 | 7/1984 | Rana et al. | 148/36 |
| 4,574,834 | 3/1986 | Inoue | 137/505.25 |
| 4,578,113 | 3/1986 | Rana et al. | 75/124 |

OTHER PUBLICATIONS

Executive Mark II—Scott Aviation Products, Lancaster, New York 14086, May 1975.
Stage 1 Adapter—Western Enterprises, Westlake, Ohio 44145, 1986.

Primary Examiner—A. Michael Chambers
Attorney, Agent, or Firm—Stanley Ktorides

[57] ABSTRACT

A valve-regulator assembly for rendering a high pressure gas source compatible with lower pressure equipment, said valve-regulator being sealable or remote from the high pressure gas source enabling recharging at high pressure.

4 Claims, 3 Drawing Sheets

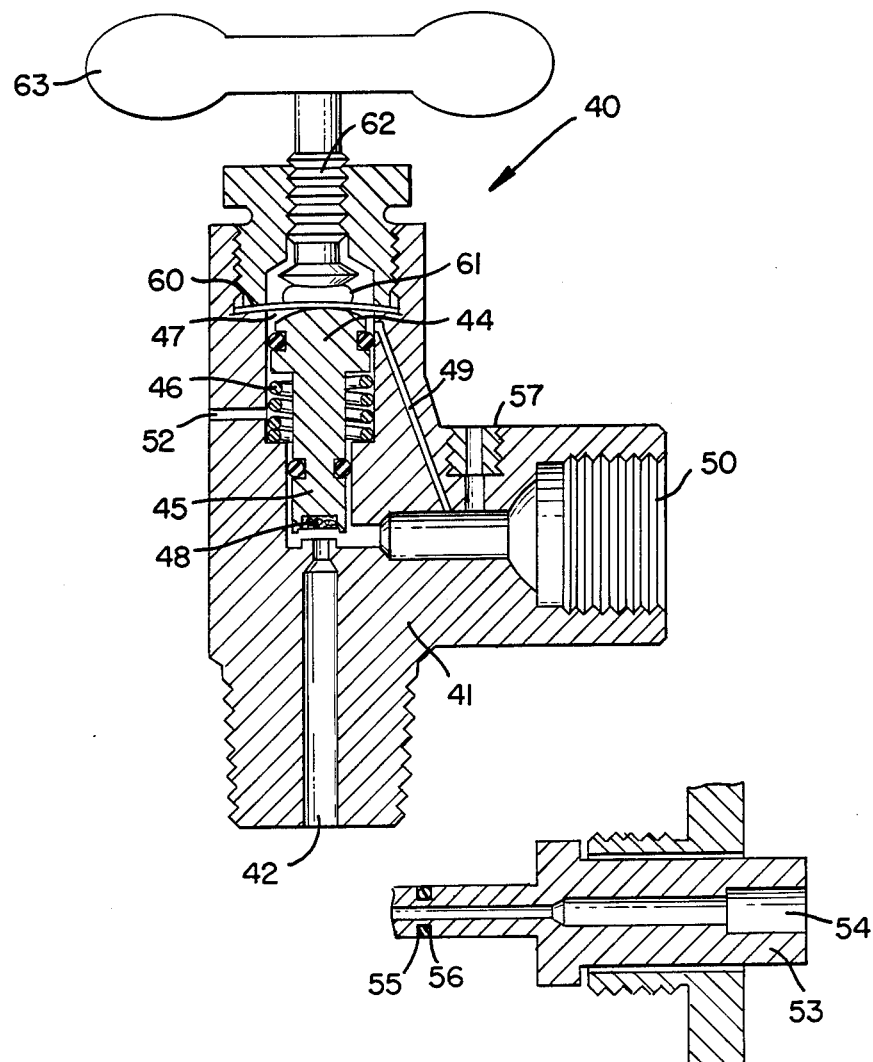

HIGH PRESSURE REGULATOR VALVE

TECHNICAL FIELD

This invention relates generally to the field of gas pressure regulation and, in particular, is an improvement for rendering a high pressure gas source compatible with a lower pressure use point.

BACKGROUND ART

A recent very significant advancement in the field of gas storage vessels, such as gas cylinders, is the high strength steel cylinder developed by Union Carbide Corporation and described and claimed in U.S. Pat. Nos. 4,461,657—Rana et al. and 4,578,113—Rana et al. This new gas storage cylinder enables the storage and transport of significantly more gas than is possible in a conventional cylinder of comparable size and weight because the gas can be safely maintained within the new gas storage cylinder at a pressure much higher than that possible with such conventional cylinders. For example, whereas a conventional cylinder may safely hold gas at a pressure up to about 2700 psia, the new high pressure gas storage cylinder may safely hold gas at a pressure up to abut 4500 psia.

Gas is used at a use point at a defined pressure or pressure range. Generally this use pressure is less than the pressure of the gas source. In such cases a pressure regulator is employed to cause a reduction in the gas pressure and to ensure that the pressure of the gas going to the use point does not exceed the allowable use point pressure limit. Accordingly, many users of gases have regulators which can regulate the pressure of gas from about 2700 psia down to the desired use point pressure.

As previously discussed, the new gas storage cylinder provides gas at a pressure significantly in excess of the conventional pressures and thus at a pressure greater than that which can be handled by conventional regulators. One solution is to change the regulator to one which can handle the higher pressures. However, this solution is costly and may be time consuming if a user switches frequently from one gas source to another because the user may also have to be switching regulators.

It is thus desirable to have a regulator which can regulate high pressure gas, such as from the new high strength cylinder, for interfacing with existing pressure regulators designed to handle gas at lower pressures.

Once the new high strength gas storage cylinder is empty of gas it must be refilled. In order to retain the advantages of the high strength cylinder it must be recharged at the high pressure. Thus it is further desirable to have a high pressure regulator which will also allow refilling of the cylinder at high pressure.

Accordingly, it is an object of this invention to provide a regulator capable of rendering a high pressure gas source compatible with a lower pressure use point while also enabling recharging of the high pressure gas source to a high pressure.

SUMMARY OF THE INVENTION

The above and other objects which will become apparent to one skilled in the art upon a reading of this disclosure are attained by the present invention, one aspect of which is:

A valve regulator assembly for rendering a high pressure gas source compatible with a lower pressure use point comprising:

(A) a valve body having main conduit means capable of flow communication with a high pressure source;

(B) a high pressure outlet in direct flow communication with said main conduit means;

(C) a regulator in direct flow communication with said main conduit means;

(D) a lower pressure outlet in flow communication with said main conduit means downstream of said regulator; and (E) a lower pressure burst disc assembly communicating between the lower pressure outlet and the outside of the valve body.

Another aspect of the present invention is:

A valve-regulator assembly for rendering a high pressure gas source compatible with a lower pressure use point comprising:

(A) a valve body having main conduit means capable of flow communication with a high pressure gas source;

(B) a regulator in direct flow communication with said main conduit means, said regulator comprising a spring-loaded piston, a sensing chamber at one end of the piston, and a sealing plug at the other end of the piston, said plug capable of stopping gas flow from the main conduit means;

(C) a lower pressure outlet in flow communication with said main conduit means downstream of said regulator;

(D) conduit means communicating between the lower pressure outlet and the sensing chamber;

(E) a lower pressure burst disc assembly communicating between the lower pressure outlet and the outside of the valve body; and (F) closure means capable of moving the regulator into a fixed position so that said plug stops gas flow from the main conduit means.

Still another aspect of the present invention is:

A regulator assembly for rendering a high pressure gas source compatible with a lower pressure use point comprising:

(A) a regulator body having a receiving conduit;

(B) a regulator within said regulator body in flow communication with said receiving conduit, said regulator comprising a spring-loaded piston, a sensing chamber at one end of the piston, and a sealing plug at the other end of the piston, said sealing plug capable of stopping gas flow from the receiving conduit;

(C) a lower pressure outlet in flow communication with said receiving conduit downstream of said regulator and passage means capable of communicating between the lower pressure outlet and the sensing chamber;

(D) passage means communicating between the spring area and the outside of the regulator body; and (E) a lower pressure burst disc assembly communicating between the lower pressure outlet and the outside of the regulator body.

As used herein, the term "high pressure" means a pressure in excess of 2700 psia.

As used herein, the term "lower pressure" means a pressure less than a particular defined high pressure.

As used herein, the term "downstream" means further removed from the high pressure gas source with respect to gas flow from the high pressure gas source.

As used herein, the term "use point" means the point, or interface, where lower pressure equipment receives gas from the lower pressure outlet of the present invention.

BRIEF DESCRIPTION OF THE DRAWINGS

FIG. 2A is a side or elevation cross-sectional view of another embodiment of the invention whereby gas may pass out of a cylinder at a lower pressure and the cylinder may be refilled at high pressure through the lower pressure outlet by use of the plug shown in cross section in FIG. 2B.

DETAILED DESCRIPTION

The invention will be described in detail with reference to the Drawings.

Figure 1:
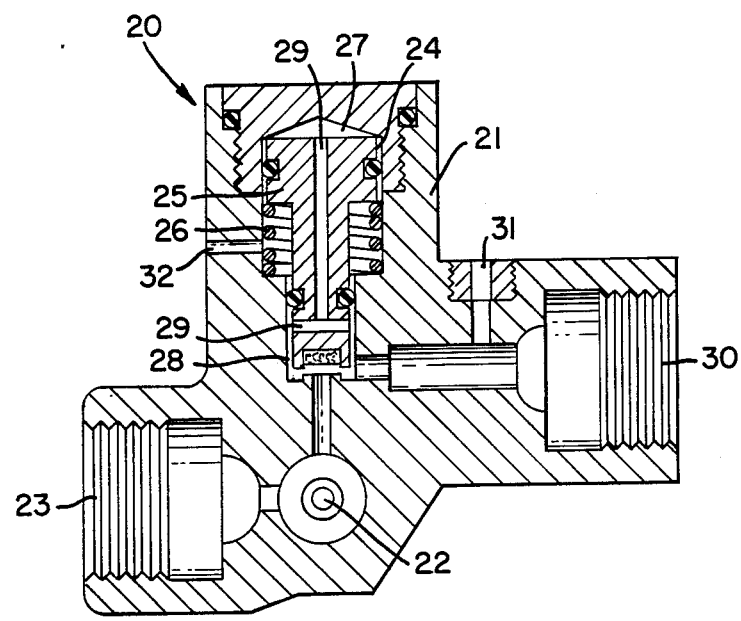
FIG. 1 is a top or plan cross-sectional view of one embodiment of the invention whereby gas may pass out of a cylinder either at a high pressure or at a lower pressure and the cylinder may be refilled at high pressure through the high pressure outlet.
Figure 4:
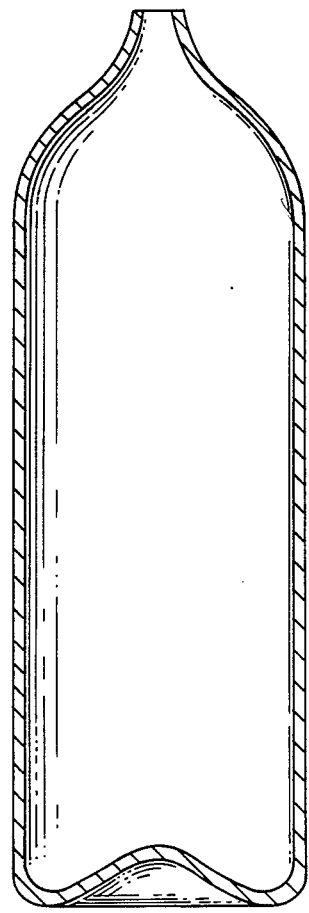
FIG. 4 is a simplified cross sectional view of a gas storage cylinder of typical design.

Referring now to FIG. 1, valve regulator assembly 20 comprises valve body 21 having main conduit 22 capable of flow communication with a high pressure source. For example, when the high pressure source is a gas storage cylinder, such as is depicted in FIG. 4, assembly 20 would fit on top of the cylinder and gas from the cylinder would pass through the neck of the cylinder into main conduit 22. As previously mentioned, FIG. 1 is a top cross sectional view of assembly 20.

High pressure outlet 23 is in direct flow communication with main conduit 22. In this way gas at high pressure may flow through outlet 23, through main conduit 22, and for, example, into the cylinder so as to recharge the cylinder at high pressure. In addition, high pressure as from the cylinder may flow through main conduit 22 and through high pressure outlet 23 so as to deliver gas at high pressure should such high pressure delivery be desired.

Also in direct flow communication with main conduit 22 is regulator 24. Preferably regulator 24 comprises piston 25 loaded by spring or springs 26. Sensing chamber 27 is at one end of piston 25 and sealing plug 28 is at the other end. Passage 29 communicates between sensing chamber 27 and low pressure outlet 30, which is in flow communication with main conduit means 22 and downstream of regulator 24. Lower pressure burst disc assembly 31 communicates between lower pressure outlet 30 and the outside of valve body 21. The burst disc assembly comprises a burst disc with gasket which are sealed in place by a threaded plug having an open center to complete a properly sized passage for relief flow if and when the disc bursts due to overpressure.

Regulator 24 is set to lock at a predetermined desired pressure by procedures, such as adjusting the compression on springs 26, well known to those skilled in the art. For example, in the case where the high pressure gas is at 4500 psia and the use point equipment at the interface can handle gas at a maximum pressure of 3000 psia, regulator 24 would be set to lock at a lower pressure, such as 2000 psia, thus ensuring that gas exceeding the use point maximum pressure is not delivered. This occurs as follows. With high pressure outlet 23 plugged off, as flows from the high pressure source through main conduit 22 and lower pressure outlet 30, and then on to a lower pressure use point. A conventional stepdown regulator may be upstream of the lower pressure use point to further reduce the pressure. The pressure of the gas within lower pressure outlet 30 will depend on the rate at which the use point is using the gas. Should the pressure in lower pressure outlet 30 rise to the 2000 psia of this example, gas flowing through conduit 29 will deliver this pressure to sensing chamber 27 causing spring-loaded piston 25 to move sealing plug 28 into position blocking off the passage from main conduit 22 so as to stop gas flow. When the pressure in lower pressure conduit 30 decreases below the setpoint, i.e. below 2000 psia, piston 25 moves back and gas flow is resumed.

In this way the use point sees gas at only conventional pressures and not at the high pressure of the high pressure source. Because of the high pressures involved, two precautions are built into the assembly. Burst disc assembly 31 serves to ensure that should regulator 24 fail, high pressure gas will be released through the burst disc assembly and thus not cause harm downstream. In addition, the chamber for springs 26 is vented to the outside of valve body 21 through passage 32 thus ensuring that should high pressure gas pass by the O-ring seals on either side of springs 26, such gas will be vented out of the assembly and not cause spring malfunction leading to regulator malfunction.

In the case where gas flow is desired through high pressure outlet 23, lower pressure outlet 30 is blocked off by an appropriate plug.

If high pressure gas delivery capability is not desired, the embodiment of the invention illustrated in FIGS. 2A and 2B may be more appropriate. Referring now to FIGS. 2A and 2B, valve regulator assembly 40 comprises valve body 41 having main conduit 42 capable of flow communication with a high pressure source such as the gas storage cylinder depicted in FIG. 4. As previously mentioned, FIG. 2A is a side cross-sectional view of assembly 40.

In direct flow communication with main conduit 42 is regulator 44 which comprises piston 45 loaded by springs 46. Sensing chamber 47 is at one end of piston 45 and sealing plug 48 is at the other end. Conduit 49 communicates between sensing chamber 47 and low pressure outlet conduit 50, which is in flow communication with main conduit 42 and downstream of regulator 44. Lower pressure burst disc assembly 51 communicates between lower pressure outlet 50 and the outside of valve body 41.

Regulator 44 regulates the flow of gas from the high pressure source through the main conduit and into the lower pressure conduit in substantially the same manner as does regulator 24 described with reference to FIG. 1. In the case of valve regulator assembly 40, gas flows from the high pressure source through main conduit 42 and lower pressure outlet 50, and then on to a lower pressure use point. A conventional stepdown regulator may be upstream of the lower pressure use point to further reduce the pressure. The pressure of the gas within lower pressure outlet 50 will depend on the rate at which the use point is using the gas. Should the pressure in lower pressure outlet 50 rise to the desired setpoint, gas flowing through conduit 49 will deliver this pressure to sensing chamber 47 causing spring-loaded piston 45 to move sealing plug 48 into position blocking of main conduit 42 so as to stop gas flow. When the pressure in lower pressure outlet conduit 50 decreases below the setpoint, piston 45 moves back and gas flow is resumed.

In this way the use point sees gas at only conventional pressures and not at the high pressure of the high pressure source. Because of the high pressures involved, two precautions are built into the assembly. Burst disc assembly 51 serves to ensure that should regulator 44 fail, high pressure gas will be released through the burst disc assembly and thus not cause harm downstream. In addition, the chamber for springs 46 is vented to the outside of valve body 41 through passage 52. Thus should high pressure gas pass by the O-ring seals on either side of spring 46, such gas will be vented out of the assembly and not cause spring malfunction leading to regulator malfunction.

When refilling of the high pressure gas source, e.g. a high pressure cylinder, is desired, plug 53 is inserted into lower pressure outlet 50. Plug 53 conforms to the shape of lower pressure outlet 50 so as to fit snugly therein. Plug 53 has a passage 54 therethrough enabling the passage of gas from outside assembly 40 into main conduit 42. In addition plug 53 has a seal around the forward end such that the respective points where passage 49 and burst disc assembly 51 communicate with lower pressure outlet 50 are both downstream of the seal when plug 53 is in position. The embodiment of FIG. 2B illustrates the seal, an O-ring 55 and with backup ring 56.

When cylinder recharge at high pressure is desired, plug 53 is threaded in position in outlet 50 and high pressure gas is passed into passage 54, through main conduit 42 and into the high pressure gas storage cylinder. Since conduit 49 is blocked off by plug 53, a low pressure, generally ambient, is applied to sensing chamber 47. Accordingly, regulator 44 remains in the unlocked position and gas freely passes without blockage by sealing plug 48. Seal 55 and 56 serves to ensure that no high pressure gas leakage occurs to either cause regulator 44 to lock or cause the burst disc to burst.

A major advantage of the valve regulator embodiment of the invention illustrated in FIG. 2A is the capability of completely shutting off flow from the main conduit independent of the regulator function. This capability is provided by a closure means which moves the regulator into a fixed position sealing off gas flow from the main conduit without regard to the gas pressure otherwise acting on the regulator. FIG. 2A illustrates a closure means comprising diaphragm 60, which is capable of contacting piston 45, and a bearing pad 61 on the other side of the diaphragm from the piston. Threaded stem 62 may be moved into position, such as by turning hardwheel 63, so as to apply pressure onto bearing pad 61, diaphragm 60 and piston 45. This causes the regulator to be moved into a fixed position so that sealing plug 48 stops gas flow from main conduit 42. This enables complete shut off of high pressure gas without the need to employ high pressure gas to seal the main conduit, and thus the use flexibility of the valve-regulator assembly of the invention is enhanced.

Figure 3:
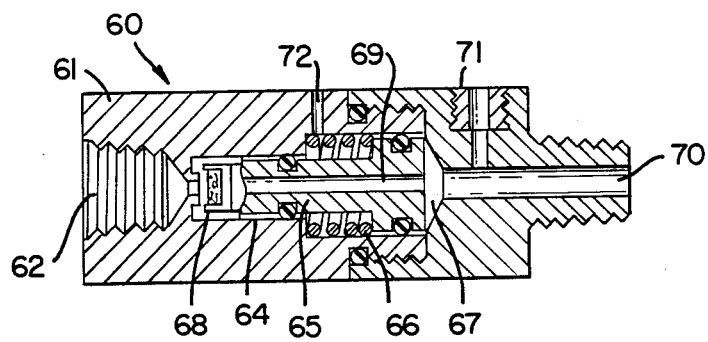
FIG. 3 is a cross-sectional view of another embodiment of the invention whereby high pressure gas is regulated to a lower pressure. Since the invention is employed remote from a gas cylinder, it enables refilling of the gas cylinder at high pressure.

Both of the embodiments of the invention illustrated in FIG. 1 and in FIGS. 2A and 2B are of a valve-regulator assembly designed to fit on a high pressure gas source, such as a gas storage cylinder, which will enable gas discharge from the cylinder at a regulated lower pressure and also enable recharge of the gas storage cylinder at high pressure. Another embodiment of the invention is illustrated in FIG. 3. This embodiment enables regulation of high pressure gas to a lower pressure remote from a high pressure gas source. Thus the gas storage cylinder, having a conventional valve, may be recharged by conventional means.

Referring now to FIG. 3, regulator assembly 60 comprises regulator body 61 within which is housed regulator 64 and receiving conduit 62 which is capable of receiving gas from a high pressure gas source such as a conduit from a high pressure gas storage cylinder. Regulator 64 comprises piston 65 loaded by springs 66. Sensing chamber 67 is at one end of piston 65 and sealing plug 68 is at the other end. Passage 69 permits gas flow between receiving conduit 62 and sensing chamber 67 and low pressure outlet 70 downstream of regulator 64. Lower pressure burst disc 71 communicates between lower pressure outlet 70 and the outside of regulator body 61.

Regulator 64 regulates the flow of gas from the high pressure source through receiving conduit 62 and into the lower pressure conduit in substantially the same manner as do regulators 24 and 44 described with reference to FIGS. 1 and 2A respectively. In the case of regulator assembly 60, however, gas flows from the high pressure source through receiving conduit 62, through passage 69, and through lower pressure outlet 70, and then on to a lower pressure use point. At the interface, a conventional stepdown regulator, upstream of the use point may further reduce the pressure. The pressure of the gas within lower pressure outlet 70 will depend on the rate at which the use point is using the gas. Should the pressure in lower pressure outlet 70 rise above the desired setpoint, gas pressure in the sensing chamber 67 causes spring loaded piston 65 to move sealing plug 68 into position blocking off receiving conduit 62 so as to stop gas flow. When the pressure in lower pressure outlet 70 decreases below the setpoint, piston 65 moves back and gas flow is resumed.

In this way the use point sees gas at only conventional pressures and not at the high pressure of the high pressure source. Because of the high pressures involved, two precautions are built into the assembly. Burst disc assembly 71 serves to ensure that should regulator 64 fail, high pressure gas will be released through the burst disc assembly and thus not cause harm downstream. In addition, the chamber for springs 66 is vented to the outside of regulator body 61 through passage 72. Thus should high pressure gas pass by the O-ring seals on either side of springs 66, such gas will be vented out of the assembly and hot cause spring malfunction leading to regulator malfunction.

Now by the use of the present invention, one can advantageously employ a high pressure gas source, such as the new high pressure gas storage cylinder, while delivering gas to a use point safely at a lower pressure compatible with the equipment at the interface. Furthermore the invention enables recharging of the gas source, such as the gas cylinder, at the high pressure.

Although the invention has been described in detail with reference to three particular embodiments, those skilled in the art will recognize that there are other embodiments of the invention within the spirit and scope of the claims.

We claim:

1. A valve-regulator assembly for rendering a high pressure gas source compatible with a lower pressure use point comprising:

(A) a valve body having main conduit means capable of flow communication with a high pressure source;

(B) a high pressure outlet at the outside of the valve body and in direct flow communication with said main conduit means and thus with the high pressure source;

(C) a regulator in direct flow communication with said main conduit means said regulator comprising a spring-loaded piston, a sensing chamber at one end of the piston, and a sealing plug at the other end of the piston, said plug capable of stopping gas flow from the main conduit means when high pressure is present in the sensing chamber, and a passage communicating between a lower pressure outlet and the sensing chamber;

(D) said lower pressure outlet in flow communication with said main conduit means downstream of said regulator; and (E) a lower pressure burst disc assembly communicating between the lower pressure outlet and the outside of the valve body.

2. The assembly of claim 1 wherein the spring is vented by a passage means communicating between the spring area and the outside of the valve body.

3. The assembly of claim 2 wherein the spring area is isolated on either side by O-ring seals concentric with the piston.

4. The assembly of claim 1 wherein the passage is within the piston.

* * * * *